Patented May 11, 1943

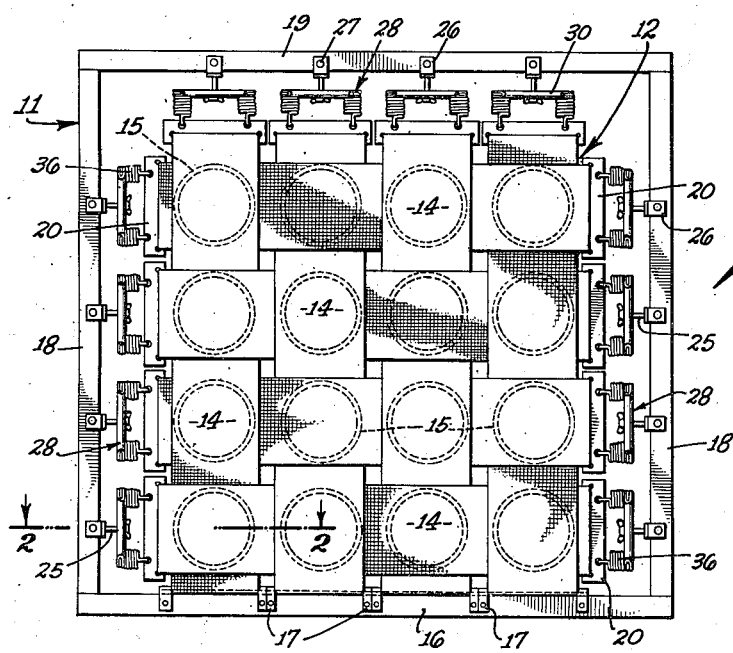

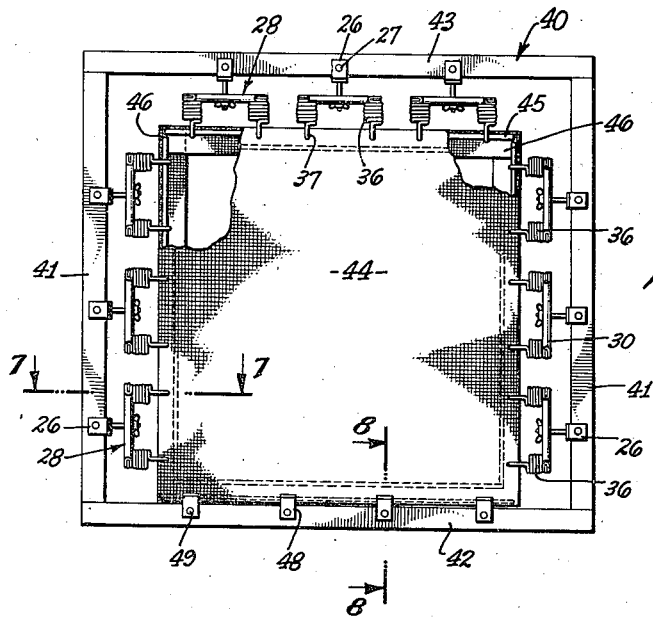
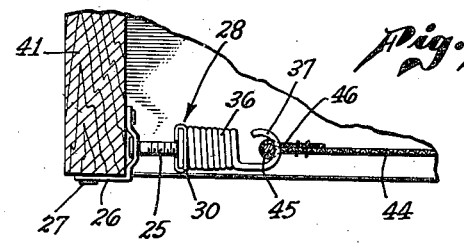
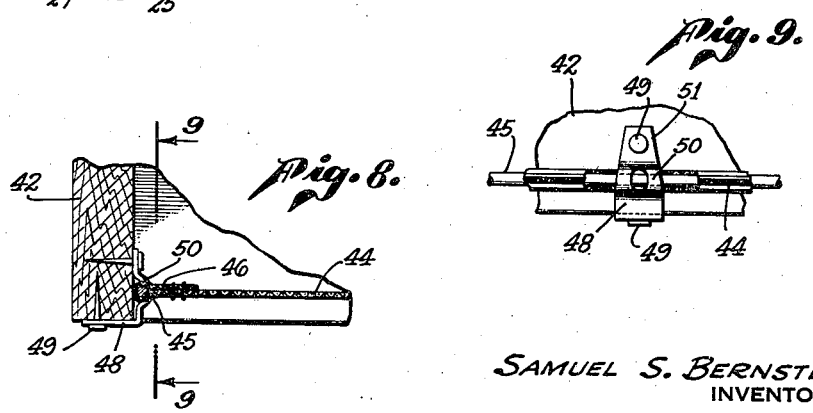

2,318,583

UNITED STATES PATENT OFFICE 2,318,583

SUSPENSION UNIT

Samuel S. Bernstein, Los Angeles, Calif.

Application August 11, 1941, Serial No. 406,330

6 Claims. (Cl. 155—179)

It is desirable to provide a resilient adjustable detachable means of securing webbing or spring supporting fabrics to the seat frames in various types of furniture. The present invention is an improvement over the means shown for accomplishing this in my earlier Patents Nos. 1,774,696 and 1,888,582.

It is a primary object of this invention to provide a new and improved spring suspension unit designed for use between a seat frame and a spring supporting fabric or webbing as part of a resilient or elastic securing means for the fabric or webbing.

It is also an object to provide a spring suspension unit of the type indicated which may be made of materials which are readily obtainable in the present national emergency, not involving, for example, the use of spring steel strap such as is used in my earlier flexible stirrup. In this connection it is an object to provide a semi-stirrup construction embodying standard helical coil springs such as are always carried as stock items.

It is also an object of the invention to provide a construction which is readily adaptable to manufacture in various sizes and various degrees of elasticity and thereby provide the means of suspending the spring supporting webbing or fabric with various degrees of elasticity or resiliency to produce a variety of softness in chair seats or the like. At the same time it is an object to provide a unit which can be adjusted at the time of installation and thereafter to suspend the fabric or webbing at any desired degree of tension.

It is a further object to provide a new and improved construction for furniture embodying a spring supporting fabric which may be easily and inexpensively manufactured.

These and other objects will be apparent from the drawings and the following description. Referring to the drawings, which are for illustrative purposes only—

Fig. 1 is an inverted plan view of a frame and spring supporting webbing anchored to the frame on three sides by means embodying the invention and directly secured to the frame on the fourth side;

Fig. 2 is an upright fragmentary sectional elevation through the frame and one of the suspension units of the invention taken on line 2—2 of Fig. 1;

Fig. 3 is an enlarged inverted plan view of the fabric webbing securing means including the suspension unit;

Fig. 4 is an enlarged fragmentary sectional detail on line 4—4 of Fig. 3;

Fig. 5 is a view of the rear side of the suspension unit taken on line 5—5 of Fig. 2;

Fig. 6 is an inverted plan view of a seat frame showing a spring supporting fabric and means for securing it to the frame embodying the invention;

Fig. 7 is an upright fragmentary cross-sectional detail on line 7—7 of Fig. 6;

Fig. 8 is an upright fragmentary cross-sectional detail on line 8—8 of Fig. 6; and Fig. 9 is a fragmentary detail view of the face of a frame wire holder on line 9—9 of Fig. 8.

More particularly describing the invention, referring to Figs. 1-5, reference numeral 11 generally indicates a frame of a seat or the like such as is commonly used in furniture construction. Adapted to be mounted to the frame for supporting the coil springs is a webbing 12 which comprises the interlaced crossed strips 14. The position of the seat coil springs have been indicated by the broken lines 15 in Fig. 1 which is an inverted plan view of the frame and webbing. It is desirable to secure the webbing to the frame by an elastic or resilient adjustable means on three edges at least in order to provide a flexible support for the coil springs 15 and so that the webbing may be stretched when initially secured in place and subsequently tightened if necessary or adjusted to the comfort of the user. The fourth edge of the webbing may be directly secured to the front of the seat frame. Thus, the webbing strips extending at right angles to the front rail 16 of the seat frame are shown secured directly thereto without any resilient or elastic connection as by attaching them directly to webbing clamps or brackets 17 nailed to the front rail of the frame. The details of this construction are unimportant to the invention.

In order to provide for flexibly and adjustably securing the webbing strips to the side rails 18 and rear rail 19 of the frame, each of the strips has its end secured to a webbing clamp plate 20. Each plate is provided with a longitudinal slot 21 adapted to receive a loop 22 (see Fig. 2) of the webbing strip. Enclosed within the loop is a retaining pin 23 serving to secure or lock the strip to the plate.

Opposite each strip is an anchor member shown as a bolt 25 mounted on the frame in any suitable manner as by means of the hanger 26 secured to the rail of the frame by nails 27. The clamp plates 20 are respectively connected to the bolts by means of the suspension units 28 which embody the invention herein disclosed. The suspension units are adjustably mounted on the bolts 25 by means of a wing nut 25'.

Referring to Figs. 2 to 5, inclusive, for a more detailed description of the suspension unit, this unit comprises a base plate 30 which is centrally apertured at 31 to receive the aforementioned bolt 25. Surrounding the aperature on the inside of the plate is a rim 32 serving to space the wing nuts from the main body of the base plate and prevent binding of the nut. The rim may be omitted if desired and a washer used. The base plate itself includes a main portion 34 and a pair of reenforcement side portions 35 which are bent back upon the main portion along the sides thereof and spaced from the main portion. A tension helical coil spring 36 is mounted on each end of the base plate. The coil springs 36 extend at right angles to the main plane of the base plate and are provided with terminal hooks 37 so that they can be detachably secured to the aforementioned clamp plates 20. It is contemplated that the coil tension springs may be secured to the base plate in any suitable manner, however, in the form of the invention shown, the base plate is provided with end slots 38 (see Fig. 3) between the side portions 35 and the main portion of the base plate so that the last or end convolution of the coil spring may be slipped between the main portion of the base plate and the two reenforcement portions and secured thereto by a deformation of the side portions around and inwardly of the end convolution of the spring as shown in Figs. 4 and 5.

It is apparent that the above described suspension unit provides an easily adjustable means of securing webbing to seat frames to provide a desired amount of tension in the webbing. The units may be easily installed and once in place may be adjusted at any time to vary the softness of the seat. As will subsequently become apparent the suspension units may also be used for securing spring supporting fabric sheets to seat frames and the like.

It is also a part of this invention to provide a new construction for flexibly securing spring supporting fabric sheets and reference is made to Figs. 6 to 9 for a detailed description of this. Referring to these figures, reference numeral 40 generally indicates a seat frame comprised of side rails 41, a front rail 42 and a rear rail 43. It has heretofore been the practice with spring supporting fabric sheets to secure the sheet to a frame formed from a single piece of wire bent to the shape of a rectangular loop with the ends secured together in a ferrule. This is a troublesome and expensive procedure because it entails the overlapping of the edges of the fabric over the wire frame and then sewing the overlapped edges to the main body of the sheet. Obviously since the sewing must be performed with the wire frame in place precaution must be taken to avoid injury to the sewing machine, etc., thereby slowing up the operation which is difficult. The operation also entails considerably extending the table space at the sewing machine so as to accommodate and support the wire frame. This is especially true of the supporting sheets for sofas and the like. In order to avoid this, applicant provides a spring supporting fabric 44 having four marginal rods or frame wires 45. These wires are secured in the overlapped marginal edges 46 of the sheet. In manufacturing these sheets, according to this invention, it is only necessary to successively fold over and stitch the edge portions 46 forming four hems for the reception of the respective wires 45 which are inserted after the sewing operation merely by piercing the fabric with the wires at the corners and forcing the wires into the hems. In this respect it should be pointed out that the material used for spring supporting sheets is usually of a loosely woven texture and does not offer any great resistance to piercing.

On three sides the spring supporting sheet may be secured to the side and rear rails of the frame by means of the suspension units 28 heretofore described. As shown in Fig. 7 the hooks 37 of the springs of the suspension units may be forced through the overlapped edges of the fabric sheet behind the marginal wire 45 to secure the parts together.

It is unnecessary to provide a flexible spring support for the sheet 44 at its front edge and, therefore, this edge of the sheet is directly secured to hangers or brackets 48. The brackets are attached to the frames by nails 49 and have an undulation or corrugation 50 to accommodate the wire frame members 45 as shown in Figs. 8 and 9. The inner leg may be tapered as shown at 51 (Fig. 9) to facilitate the piercing of the fabric sheet during installation.

It is obvious that the construction shown in Figs. 6 to 9 provides a flexible, adjustable spring supporting means which can be easily manufactured and assembled.

Although the invention has been shown and described with reference to specific embodiments it is contemplated that various changes may be made without departing from the invention and it is intended to cover such changes and modifications as come within the scope of the claims.

I claim as my invention:

1. In a furniture seat construction or the like, a seat frame; a spring supporting webbing including a plurality of flexible strips; a clamp plate secured at the end of each strip; an anchor member mounted on said frame opposite the end of each strip and extending inwardly of the frame; and a plurality of suspension units connecting said anchor members with the respectively opposite clamp plates at the ends of the strips, said units each comprising a base detachably secured to the anchor member and a pair of spaced helical coil springs mounted on the base and detachably secured to the clamp plate.

2. For use in furniture seat construction or the like for providing an elastic adjustable connection between a spring supporting webbing or fabric and a seat frame; a suspension unit comprising a base plate apertured to receive a bolt or the like; and a pair of tension helical coil springs rigidly mounted on said base one at each end thereof with their axes at right angles to the base.

3. For use in furniture seat construction or the like for providing an elastic adjustable connection between a spring supporting webbing or fabric and a seat frame; a suspension unit comprising a base plate of metal having a centrally apertured main portion and having reenforcement side portions bent back upon the main portion; and a tension helical coil spring rigidly mounted at each end thereof and extending at right angles to the plane of the base plate.

4. For use in furniture seat construction or the like for providing an elastic adjustable connection between a spring supporting webbing or fabric and a seat frame; a suspension unit comprising a base plate having a centrally apertured main portion and a pair of reenforcement side portions bent upon the main portion; and a tension coil spring mounted at each end of said base plate and extending at right angles to the plane of the base plate, said springs each having a hook at their outer end and having their inner convolutions secured between the main portion of the base plate and the reenforcement side portions, said side portions being deformed over and inside the inner convolution of each spring to secure the same in place.

5. In furniture seat construction or the like, a seat frame; a spring supporting webbing including a plurality of flexible strips; a clamp plate secured at the end of each strip; an anchor member mounted on said frame opposite the end of each strip and extending inwardly of the frame; and a plurality of suspension units connecting said anchor members with the respectively opposite clamp plates at the ends of the strips, said units each comprising a base attached to the anchor member and a pair of spaced helical coil springs mounted on the base and detachably secured to the clamp plate; and means on each of said anchor members for adjusting the respective suspension units thereon whereby the tension on said strips can be adjusted.

6. In suspension means of the type described, an anchor plate adapted to be mounted on a frame or the like; a bolt extending from said anchor plate; a nut on said bolt; and a connecting member adapted to secure a webbing strip or the like to the frame comprising an apertured base plate on said bolt between said anchor plate and said nut and a pair of coil springs rigidly mounted one at each end of the base plate and extending at right angles thereto, said springs terminating in hook portions.

SAMUEL S. BERNSTEIN.